United States Patent
Dzekon et al.

(10) Patent No.: US 9,219,684 B2
(45) Date of Patent: Dec. 22, 2015

(54) METHODS AND SYSTEMS FOR PACKET DELIVERY BASED UPON EMBEDDED INSTRUCTIONS

(71) Applicants: Grigori Dzekon, San Francisco, CA (US); Igor Tarasenko, San Francisco, CA (US)

(72) Inventors: Grigori Dzekon, San Francisco, CA (US); Igor Tarasenko, San Francisco, CA (US)

(*) Notice: Subject to any disclaimer, the term of this patent is extended or adjusted under 35 U.S.C. 154(b) by 234 days.

(21) Appl. No.: 14/021,414

(22) Filed: Sep. 9, 2013

(65) Prior Publication Data

US 2015/0071109 A1 Mar. 12, 2015

(51) Int. Cl.
*H04L 12/721* (2013.01)
*H04L 12/24* (2006.01)
*H04L 12/751* (2013.01)

(52) U.S. Cl.
CPC .......... *H04L 45/72* (2013.01); *H04L 41/0876* (2013.01); *H04L 45/02* (2013.01)

(58) Field of Classification Search
None
See application file for complete search history.

(56) References Cited

U.S. PATENT DOCUMENTS

| | | | | |
|---|---|---|---|---|
| 5,920,705 A * | 7/1999 | Lyon et al. | | 709/240 |
| 6,160,804 A * | 12/2000 | Ahmed et al. | | 370/349 |
| 6,473,421 B1 * | 10/2002 | Tappan | | 370/351 |
| 7,616,637 B1 * | 11/2009 | Lee et al. | | 370/394 |
| 2003/0053414 A1 * | 3/2003 | Akahane et al. | | 370/216 |
| 2005/0220072 A1 * | 10/2005 | Boustead et al. | | 370/351 |
| 2005/0232263 A1 * | 10/2005 | Sagara | | 370/389 |
| 2005/0243711 A1 * | 11/2005 | Alicherry et al. | | 370/216 |
| 2012/0094642 A1 * | 4/2012 | Popperl et al. | | 455/415 |
| 2013/0039214 A1 * | 2/2013 | Yedavalli et al. | | 370/254 |
| 2013/0287027 A1 * | 10/2013 | Ra et al. | | 370/392 |

* cited by examiner

*Primary Examiner* — Chirag Shah
*Assistant Examiner* — Joshua Smith
(74) *Attorney, Agent, or Firm* — Steven A. Nielsen; www.NielsenPatents.com

(57) ABSTRACT

New communication system with packet's retransmission elements that do not use and do not depend on any routing protocol provides definite mechanisms to deliver packets from sender to receiver. Packet's retransmission elements are no longer in charge for calculating and maintaining routing tables in order to make decision regarding packet forwarding from ingress port to egress port. Each packet besides data contains set of instructions that presents complete path description from sender to receiver and rules of packet's processing on its way depending on various network metrics. The set of instructions is devised to be executed or interpreted by each network element that packet passing through. The outcome of instructions execution provides decision regarding packet forwarding and transformation. In order to provide information for path calculation and rules of packet processing there are centralized services—Network map, Pathfinder, Name registrar and Network policy.

1 Claim, 9 Drawing Sheets

METHODS AND SYSTEMS FOR PACKET DELIVERY BASED UPON EMBEDDED INSTRUCTIONS

COPYRIGHT AND TRADEMARK NOTICE

This application includes material, which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION (1) Field of the Invention

The invention generally relates to communication networks. More particularly, disclosed embodiments related to means, methods and systems for delivering (i.e. directing and transforming) data packets from sender to receiver(s).

(2) Description of the Related Art

Present networks inefficiencies are due to necessity of maintaining routing tables and packet processing rules by each networks elements on the possible way of the data packet from sender to receiver(s).

There are many weak points in the current art, as the current technology requires every single retransmission network element to maintain its own instance of network topology and packet flow descriptions; to calculate possible packet routes through known part of network and to set up the possible packet processing actions. Ongoing changes in the connectivity of a particular retransmission network element are required to be communicated to many other elements (not limited to adjacent), causing further rebuilding of the topology description by all those elements. Changing of flow processing rules are required to be propagated to all network retransmission elements on the possible way of that packet flow.

The prior art is premised upon huge stack of network protocols implementations and manual work involvements in processes of network configuration. Thus, there is a present and long felt need in the art for the disclosed embodiments.

BRIEF SUMMARY OF THE INVENTION

The present invention overcomes weak points in the related art by presenting an unobvious and unique combinations, configurations and use of methods, systems and means to embed instructions set into every packet such that the packets direct themselves to their respective destinations without the need for each network element on the packet way to look up routing tables. Disclosed embodiments give each packet self-direction abilities, akin to a traveler driving their own vehicle upon a maze of freeways. The same embedded instructions set besides directing provides to each network element with actions description that are to be performed upon the packet. The instructions embedded into the disclosed packet are to be extracted and executed by all network elements.

Disclosed embodiments overcome the prior art by the use of network retransmission elements that are no longer engaged in maintaining routing tables and packet processing rules but rather dedicated only to maintain its own links and provide resources to execute set of instructions. Thus, new efficiencies in packet delivery are achieved.

The disclosed embodiments present a major paradigm shift in creating packets with embedded directing and transformation instructions instead of needs to support routing and flow treatment configurations on all network elements. Disclosed embodiments are sometimes referred to as routing-table-free networking (RTFN).

Disclosed embodiments include:

1. A special-format packet that shall consist of instructions set and data segments framed into link-level header and trailer.

2. A Network Map Service (NMS) that shall create network topology (or map) upon receipt of information regarding links (or interfaces) from each network element.

3. A Path Finder Service (PFS) that shall compute the paths (comprising description of network elements sequences) between elements on the network map.

4. A Name Registrar Service (NRS) that shall map names of network elements to their respective identifiers on the network map.

5. A Network Policy Service (NPS) that shall distribute the rules of instructions set execution to all network elements.

6. A Network Intersection (NI) and Gate (NG) that shall retransmit packets by means of instructions set execution. NI and NG are sometimes referred to as network retransmission elements.

7. A Network Endpoint (NE) that shall produce and consume data wherein special-format packets are used to carry data.

8. A physical link that shall connect all above-mentioned network elements: NMS, PFS, NRS, NPS, NI, NG and NE.

REFERENCE NUMERALS IN THE DRAWINGS

Figure 1:
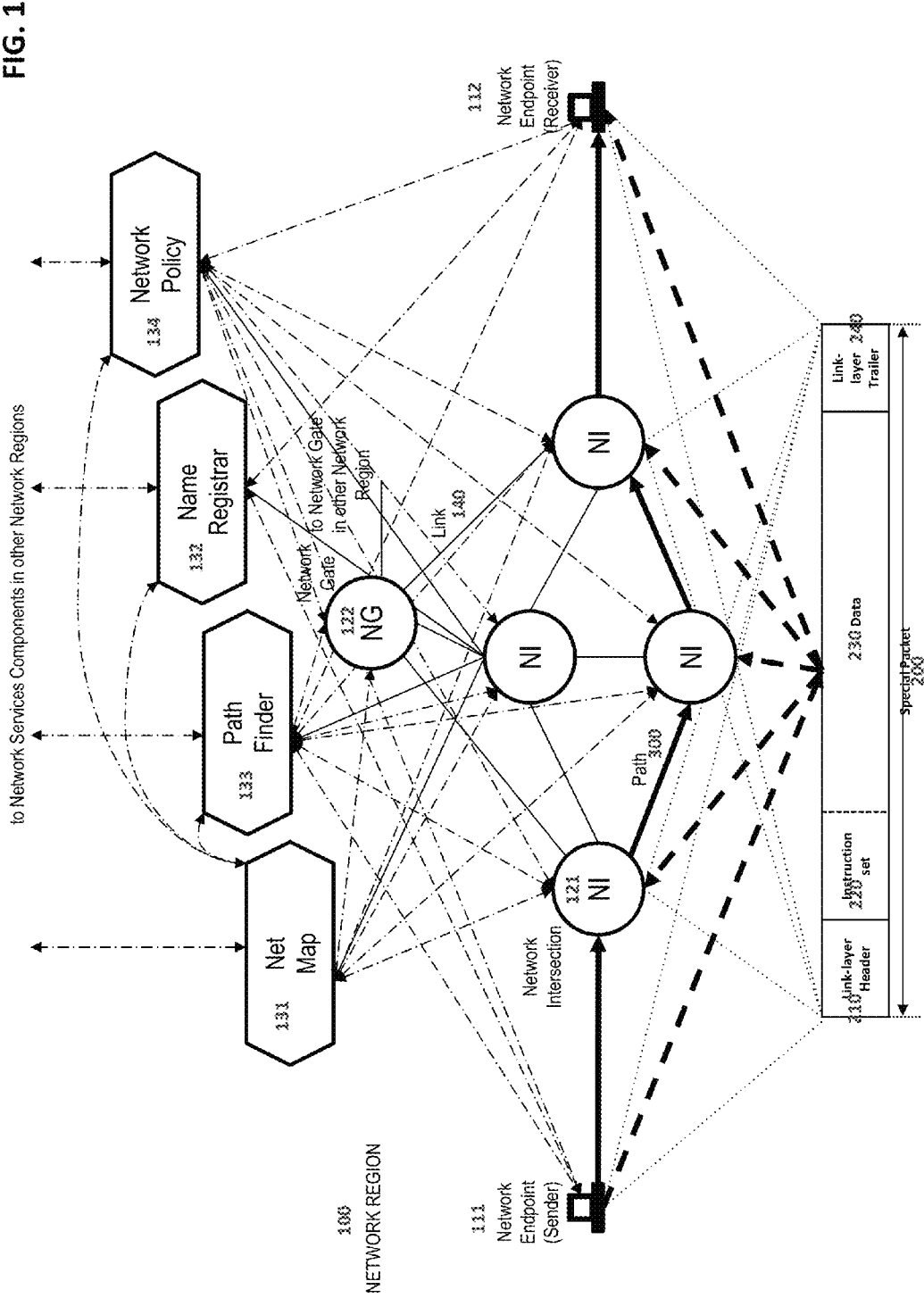
FIG. 1 is a schematic view of components of RTFN elements presenting single network region

100 network region
110 network endpoint or NE
111 sender network endpoint
112 receiver network endpoint
120 network retransmission element
121 intra-region network retransmission element or network intersection or NI
122 intra-region network retransmission element or network gate or NG
130 network services
131 network map service or NMS
132 name registrar service or NRS
133 pathfinder service or PFS
134 network policy service or NPS
140 link
200 special packet
210 link layer header of packet 200
220 instructions set of packet 200
230 data section of packet 200

240 link layer trailer of packet 200
300 path
400 network planes
410 forwarding network plane
420 processing network plane
430 supporting network plane
440 topology network plane
450 policy network plane
460 creation/consumption network plane
500 network control messages
510 network topology related massages
511 link state update messages
512 element state update messages
513 network state update messages
520 name registration related messages
521 name or identifier registration messages
522 name or identifier resolving messages
523 advertising name zone messages
530 pathfinder related messages
531 endpoint path-request messages
532 service and retransmission elements path-request messages
540 network policy related messages
600 network topology
1001 network region A
1002 network region B
1003 network region C
1004 network region D
1100 a contemplated series of steps for packet processing
1110 actions upon packet
1111 network element receives a packet
1112 network element stores original packet
1113 network element extracts and prepares packet instruction set for execution
1114 network element modifies packet, if necessary
1115 network element transfers packet, if necessary
1116 network element keeps modified packet, if necessary
1117 network element kills packet, if necessary
1120 instructions for packet
1121 begin execution of instruction set
1122 locate the packet, if necessary
1123 define variables for the packet such as path, routing procedure, needed actions and others
1124 define the state of the network element including its links, resources etc.
1125 calculate of next hope for packet
1126 rebuild flow description, if necessary
1127 rebuild routing algorithm, if necessary
1128 rebuild path description, if necessary
1129 rebuild required action set, if necessary
1131 define currently required actions
1132 call of starting of action execution
1133 end of execution of instruction set
1200 packet processing defined within functional levels of network elements
1210 element state support level
1211 update service paths
1212 keep service paths
1213 keep link state
1214 update map
1220 packet manipulation level
1221 receive packet
1222 store packet
1223 modify packet
1224 transmit packet
1225 keep packet or fragments
1226 kill packet
1230 instruction execution level
1231 load instruction set
1232 extract instruction operands
1233 extract instruction code
1234 execute instructions cycle one
1235 execute instructions cycle two
1236 execute instructions cycle N
1237 modify instruction code
1238 modify instruction operands
1239 store updated instruction set
1241 define action set
1250 processing policy support level
1251 update processing policy
1252 keep processing policy
1300 packet processing defined within functional components of network element
1310 monitoring units
1311 maintain device
1312 prepare control message for neighbor element or network service
1313 request storage
1314 transmit packet to memory
1315 update status information
1316 allocate unit buffer
1317 load packet from memory
1318 process message from neighbor or network service
1319 update policy description
1320 transformation units
1321 allocate encryptor and encoder
1322 encrypt, encode and otherwise manipulate data
1323 release encryptor and encoder
1330 execution units
1331 store local data in registers
1332 allocate processing threads
1333 store instructions in cache
1334 execute instructions
1335 request action execution
1336 release processing threads
1337 store processing policy description
1340 storage units
1341 allocate memory
1342 write packet into memory
1343 request processing
1344 copy program into cache
1345 read data from memory
1346 re-write data into memory
1347 read packet from memory
1348 release memory
1350 interface units
1351 receive frame from link
1352 allocate interface buffer
1353 store frame in interface buffer
1354 request storage
1355 preprocess and transmit packet to memory
1356 release interface buffer
1361 allocate interface buffer
1362 store packet in interface buffer
1363 assembly and move frame into link
1364 release interface buffer
1370 orchestration units
1371 allocate interface unit resource for incoming packet
1372 allocate storage unit resource
1373 allocate execution unit resource
1374 allocate transformation unit resource
1375 allocate interface unit resource for outgoing packet
1381 release transmission unit resource for incoming packet
1382 release storage unit resource 1383 release execution unit resource
1384 release transformation unit resource
1385 release interface unit resource for outgoing packet
1391 orchestrate operations with packets
1400 network element state diagram
1410 receive packet from link
1420 create packet by monitoring unit
1430 store packet in memory
1431 retrieve processing policy
1432 retrieve stored instruction
1433 retrieve description of link, element and service path description
1434 execute instructions
1435 modify packet
1440 transmit packet into link
1450 transmit packet to monitoring unit
1451 update processing policy description
1452 update link state description
1453 update element state description
1454 update service path description
1455 store processing policy description
1456 store link, element and service path description
1460 keep packet
1470 release memory
1480 idle These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

Referring to FIG. 1, a schematic view of disclosed components are used to implement a disclosed table free routing network comprising a source network endpoint or sender 111, a destination network endpoint or receiver 112, a plurality of network intersections 121, a network gate 122, a network map service or NMS or net map 131, a name registrar service or NRS or name registrar 132, a path finder service or PFS or path finder 133, a network policy service or network policy 134, a plurality of links 140, a special packet or packet 200. Disclosed components are shown to be in a network region 100, but a plurality of network regions are contemplated as further described herein.

The packet 200 may comprise a link layer header 210, an instruction set 220, data 230 and a link layer trailer 240.

A source network endpoint or sender 111 may exchange data regarding its links with neighbors, provide data describing itself to name registrar, create data in internal application, request location of data receiver on the map, request a path to the destination host, embed in a packet instruction set including path 300 description as well as commands how to follow the path, execute instructions to define requested actions, modify any part of the packet, and sends the packet.

A destination network endpoint or receiver 112 may exchange data regarding its links with neighbors, provide data describing itself to name registrar, receive packets, execute instructions to define requested actions, modify any part of the packet, consume the packet data by internal application.

A network intersection 121 may exchange data regarding its links with neighbors, provide its link description to net map, receive packets on ingress interface, execute instructions to define requested actions, modify any part of the packet, forward the packet to the network through the egress interface.

A network gate 122 may perform all the same functions as network intersection plus link or lead to another network region.

Within a network region, a network map service 131 or NMS may exchange data regarding its links with neighbors, build a network topology map retrieving link-regarded data from network intersections 121 and gates 122, update the map based upon those network element status and provide data regarding network topology to name registrar 132, path finder 133 and network policy 134.

Within a network region, a name registrar 132 or NRS may exchange data regarding its links with neighbors, build a connected endpoints description registry, update the registry according to the status of endpoints and provide data regarding connected endpoints.

Within a network region, a path finder service 133 or PFS may exchange data regarding its links with neighbors, receive data from a NMS. A PFS may receive a request for path calculation between any network elements, calculate a path and provide a path description to requesting element.

Within a network region, a network policy 134 or NPS may exchange data regarding its links with neighbors, create rules for generation and execution instructions, and distribute rules to all network elements.

The network map 131, name registrar 132, pathfinder 133, and network policy 134 are shown to be in communication with network services components in other network regions.

Links 140 are shown to interconnect all components.

Figure 2:
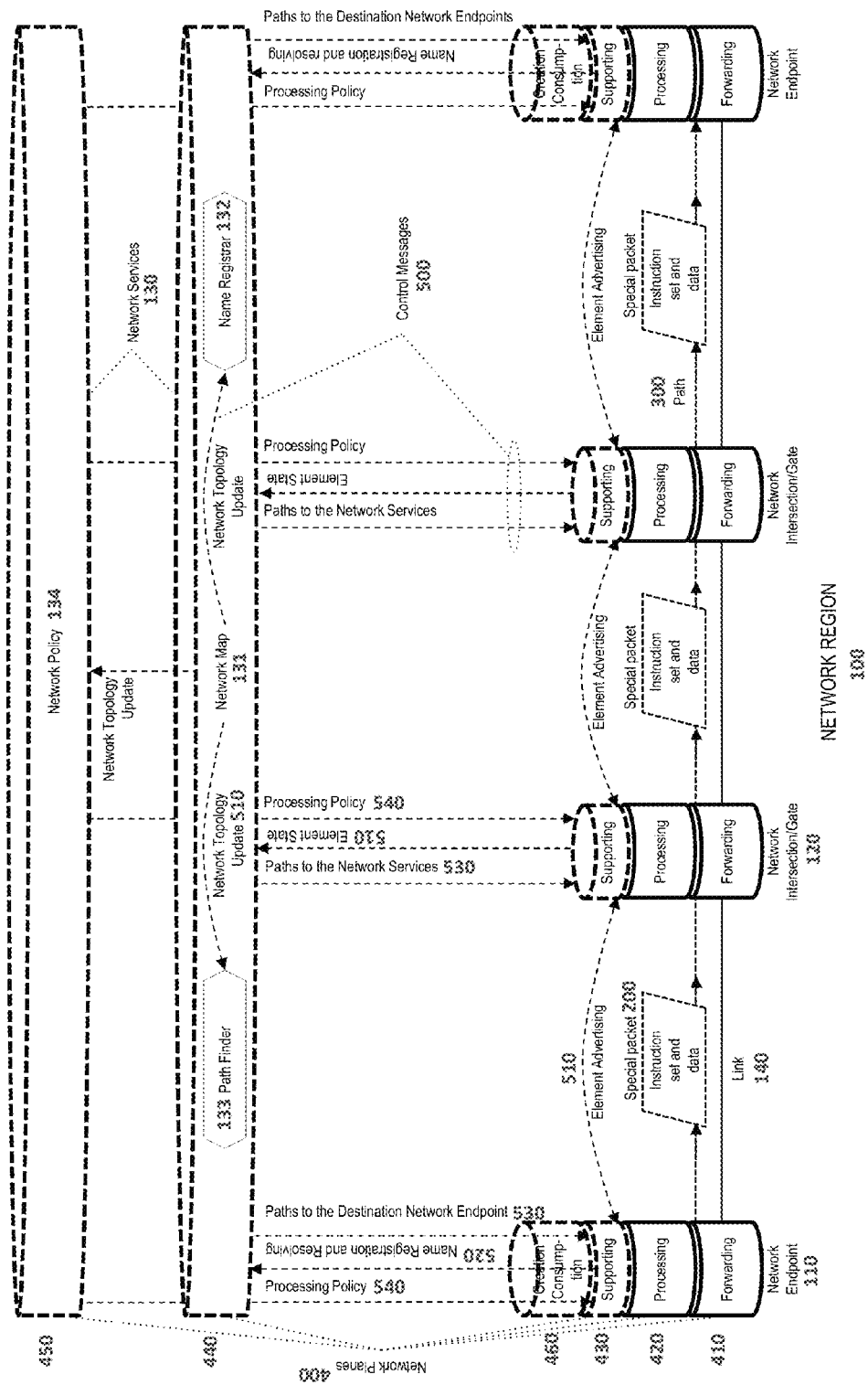
FIG. 2 is a schematic view of interactions between disclosed elements

Referring to FIG. 2, in general, various interactions between network elements is shown based on using of control messages 500. Network elements are shown splatted into functional network planes 400. Routing table free network comprises a packet forwarding network plane or forwarding plane 410, packet processing network plane or processing plane 420, service supporting network plane or supporting plane 430, topology-related services network plane or topology plane 440, policy-related service network plane or policy plane 450, data creation/consumption network plane or creation/consumption plane 460. Supporting 430, topology 440, policy 450 and creation/consumption 460 planes are supposed to be implemented as software applications, whereas forwarding 410 and processing 420 planes are supposed to be implemented in hardware.

Overall, the network services comprise a network policy service or network policy 134. The network policy service may distribute rules regarding generation and execution of instructions to all network elements. The rules may be generated based on topology data.

The topology-related services are shown as a layer of components just below the network policy. The network map service 131 is shown to receive element state changes from all network elements and transmit network topology updates to the all network services. The network map 131, name registrar 132 and path finder 133 services are shown to be in communication with a plurality of network endpoints 110 and network intersection/gates 120.

Each network endpoint 110 or a plurality thereof may comprise forwarding plane 410, processing plane 420, supporting plane 430 and creation/consumption plane 460. Each network endpoint 110 may send name registration and resolve-requesting 520 messages; receive path description 530 and processing policy 540 messages. Each network endpoint 110 may send and receive element-advertising 510 messages to and from neighbor network intersection/gate.

Each network intersection/gate 120 or a plurality thereof may comprise forwarding plane 410, processing plane 420 and supporting plane 430. A network intersection 120 may send element state description 510 messages; receive paths to network services 530 and processing policy 540 messages. Each network intersection/gate 120 may send and receive element-advertising 510 messages to and from neighbor network elements.

Packets 200 are shown to be transmitted along the path 300 from left to right between network endpoints 110 and network intersections/gates 120.

Figure 3:
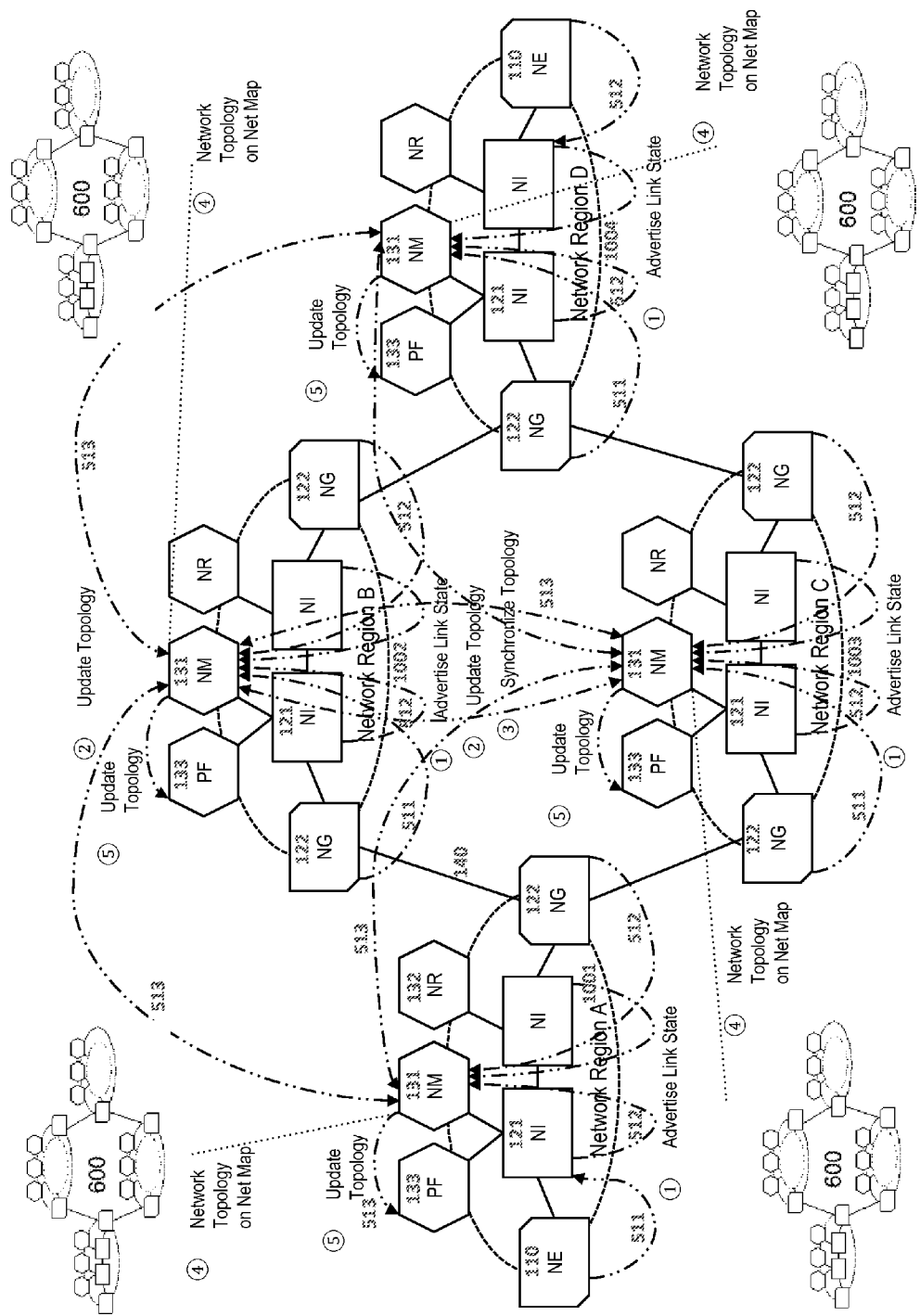
FIG. 3 is a schematic view of NMS interactions

Referring to FIG. 3, network map service 131 functioning is shown to occur within and between a plurality of network regions. Starting in each network region (A 1001, B 1002, C 1003 and D 1004), link states 511 are advertised between network endpoints 110 and network intersections or NE 121. Further, the network intersections or NIs 121 and network gates or NGs 122 advertise link state changes 512 to a network map or NM 131. In general, processing of link state advertises messages by each regional net map 131 results in a network topology 600 creation of each network region. Each regional net map 131 may receive updated topology from a net map 131 of another network region and, in such way, build the entire network topology 600 view. There are shown that communication and transfer of information occurs between network regions via network gateways or NGs 122. In general, communication between network regions includes advertisements of link states between NGs 122 and synchronization of topology between NMs 131.

Figure 4:
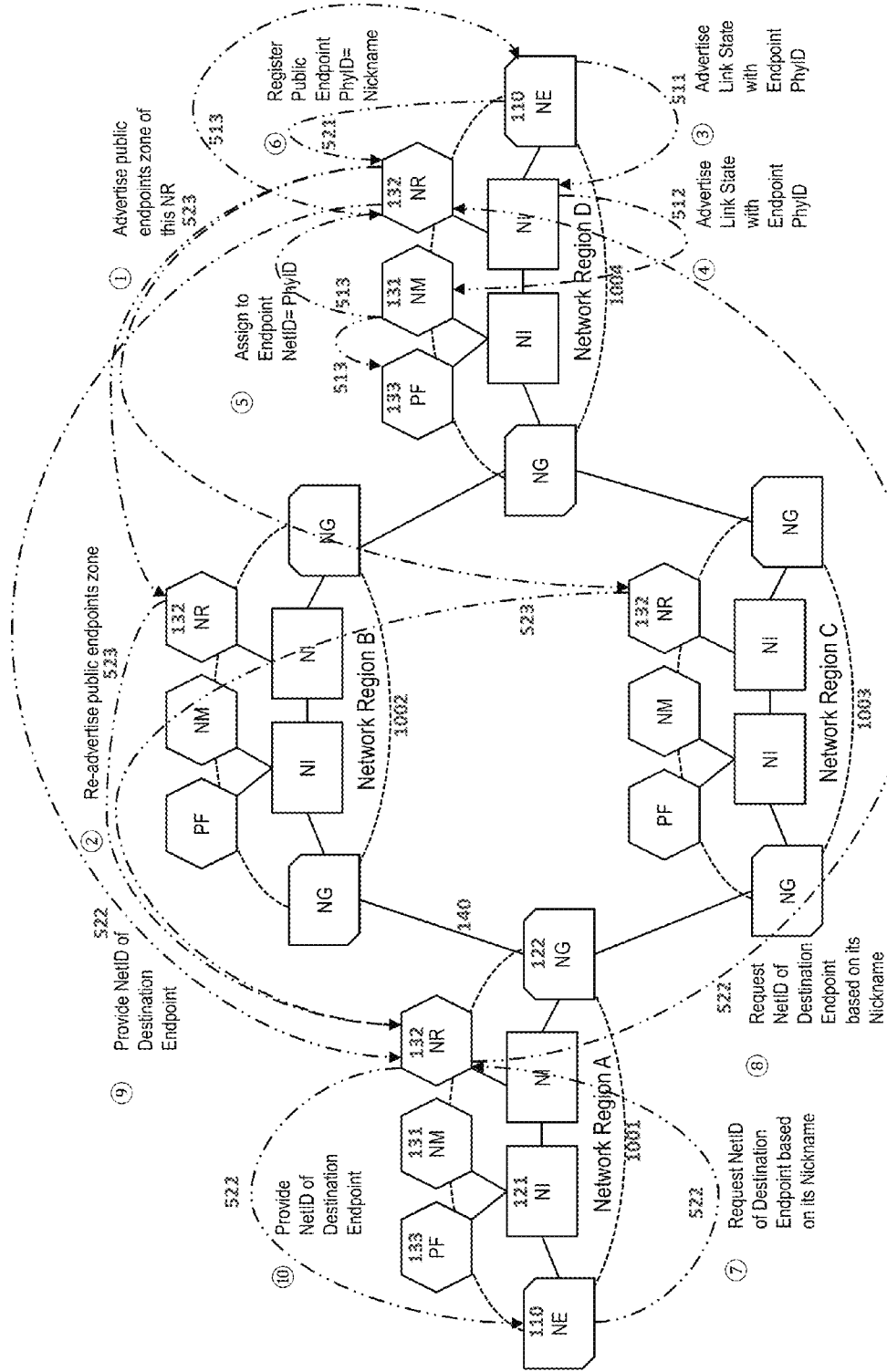
FIG. 4 is a schematic view of NRS interactions

Referring to FIG. 4, name registrar service 132 functioning is shown to occur within and between a plurality of network regions. A general method is illustrated wherein a name registrar 132 of network region D 1040 advertises public endpoints zone 523 to the name registrars 132 of network regions B 1002 and name registrars 132 of network regions C 1003. In the next step, the name registrars 132 of network region B 1002 and network region C 1003 re-advertise new public endpoints zone to the name registrar 132 of network region A 1001. In another step, back in network region D 1004 the NE 110 advertises the link state with an endpoint physical identifier or PhyID 511 to a NI 121. In a next step, the NI 121 makes the advertisement 512 (link state with an endpoint physical ID) to the net map service or NM 131. The NM may assign a network identifier or NetID to an endpoint PhyID and transmit such assignment 513 to a path finder 133 (as topology update) and name register 132 services of the network region. The NR may transmit the information about NetID assignment 513 to the appropriate NE 110. In a next step, the NE 110 of region D may register on the NR 132 an endpoint nickname in the previously announced public zone.

In a next step, referring to region A 1001, a source endpoint 110 requests 522 from a NR 132 the NetID of destination endpoint 110 based upon its known nickname from public zone.

In a next step, the NR of network region A makes a request 522 to the NR of network region D (that maintains the public zone where destination endpoint nickname was registered) to obtain the NetID of the destination endpoint based upon its nickname. In a next step, the NR of region D provides 522 the NetID of the destination endpoint to the NR of region A. IN a next step, the NR of region A provides 522 the Net ID of the destination endpoint to a NE of region A.

Figure 5:
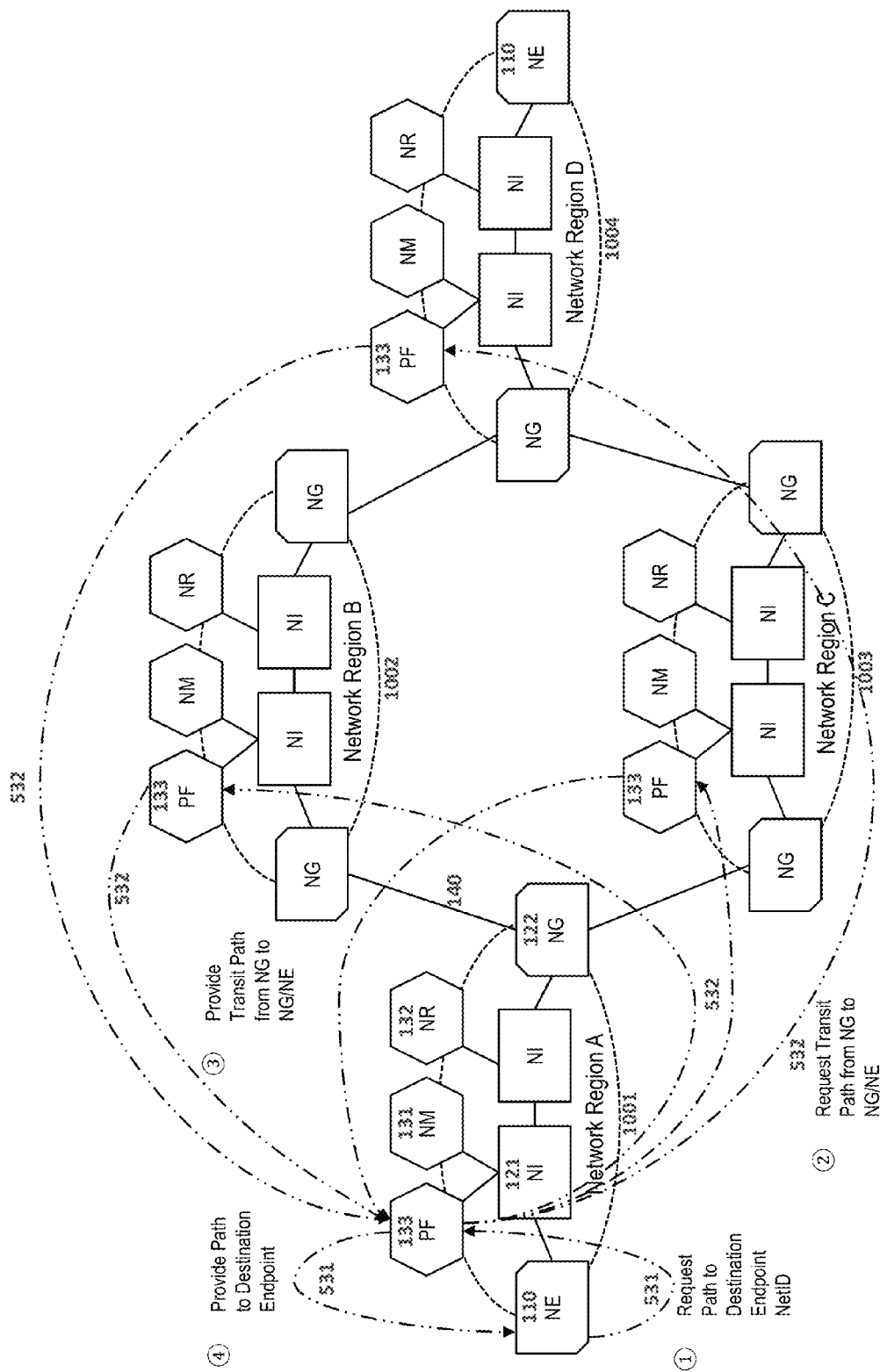
FIG. 5 is a schematic view of PFS interactions

Referring to FIG. 5, path finder service 133 functioning is shown to occur within and between a plurality of network regions. A further example of path finding is shown wherein a first step in network region A 1001 comprises a NE 110 requesting 531 from a PF 133, a path to a destination endpoint 110 with NetID. NetID defines the destination network region allowing a PF of network region A finds all transit regions based on topology data. The further steps comprise the requests 532 for the transit paths from a PF of network region A to PFs of all transit and destination network regions. The requests answered 532 by PFs of all requested network regions. The PF of network region A is then shown to communicate to the NE of network region A providing 531 a path description to the destination endpoint.

Figure 6:
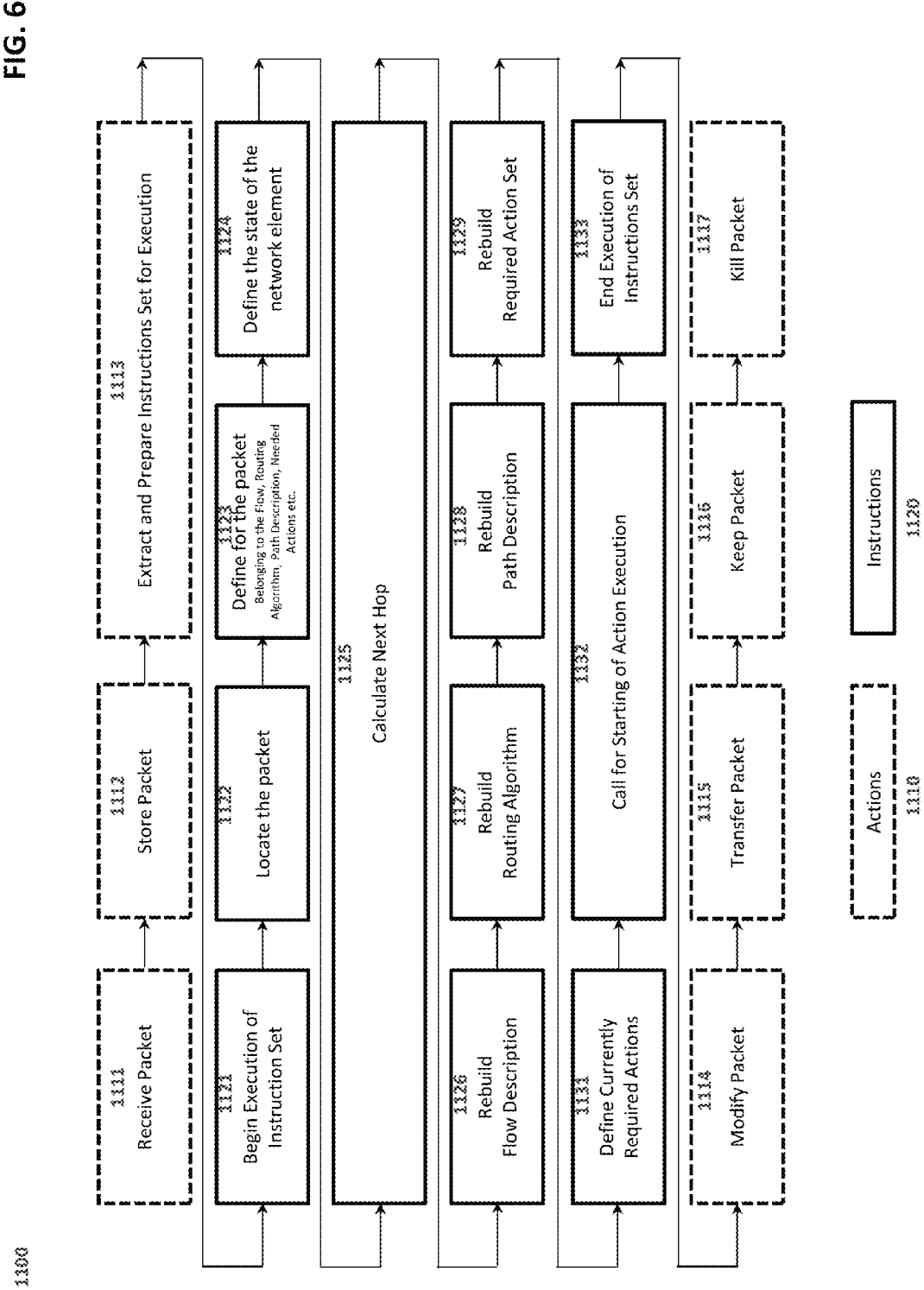
FIG. 6 is a flow chart of disclosed methods of packet processing by network elements

Referring to FIG. 6, in general means, methods and procedures are shown for packet processing on every network element in the routing-table-free network. Various steps are disclosed as each packet moves from one network element to another. Steps are sometimes considered instructions 1120, packet processing steps or sequence. At various stages, actions 1110 are performed upon the packets. Some of the shown instructions and actions are performed only if necessary.

In a first step, a network element, receives 1111 a packet. A next step includes a placement packet in the memory 1112. A next step includes the extraction and preparation of an instruction set for execution 1113. The receiving of a packet, placement it in a memory and extracting an instruction set from a packet are considered the actions 1110 and illustrated in dots.

Another step includes the beginning of execution of an instruction set 1121. Another set may include defining the current location of the packet 1122. Another step may include defining for the packet such variables as flow, routing procedures or a routing algorithm, path description and needed actions 1123. A next step may include defining the state of the network element 1124. A next step includes the calculation of the next hop 1125.

If needed, the following steps may occur, rebuild the flow description 1126, rebuild a routing algorithm 1127, rebuild a path description 1128 and rebuild required action set 1129. Further instructions include defining the currently required actions 1131, calling for action execution start 1132 and stopping the execution of instruction set 1133.

The next actions, if needed, may include modifying the packet 1114, transferring the packet 1115, storing packet 1116 and killing the packet 1117.

Figure 7:
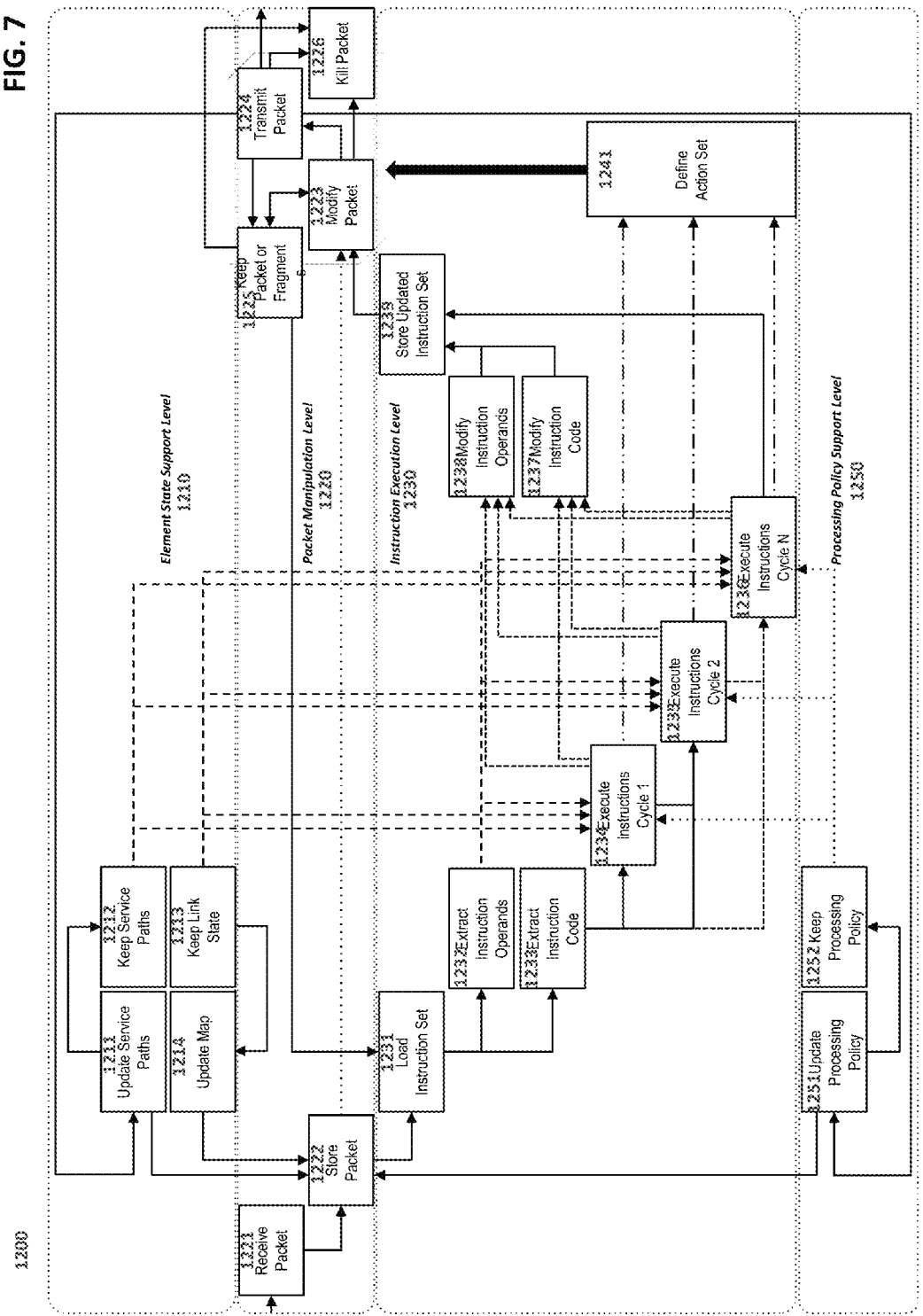
FIG. 7 is a schematic view of disclosed methods of packet processing described as functional blocks

FIG. 7 further depicts packet processing on every network element in the routing-table-free network. Packet processing in disclosed system 1200 is described within several functional layers that include element state support level 1210, packet manipulation level 1220, instruction execution level 1230 and processing policy support level 1250.

Actions or steps within the element state support level 1210 include: update service paths 1211, keep service paths 1212, update map 1213, keep link state 1214.

Actions or steps within the packet manipulation level 1120 include: receive packet 1221, store packet 1222, modify packet 1223, transmit packet 1224, keep packet or fragment 1225 and kill packet 1226.

Actions or steps within the instruction execution level 1230 include: load instruction set (and execute directives) 1231, extract instruction operands 1232, extract instruction code 1233, execute instructions cycle one 1234, execute instructions cycle two 1235, execute instructions cycle N 1236, modify instruction code 1237 (if needed), modify instruction operands 1238, store updated instruction set 1239 and define action set 1241.

Actions or steps within the processing policy support level 1250 include: update processing policy 1251 and keep processing policy 1252.

Figure 8:
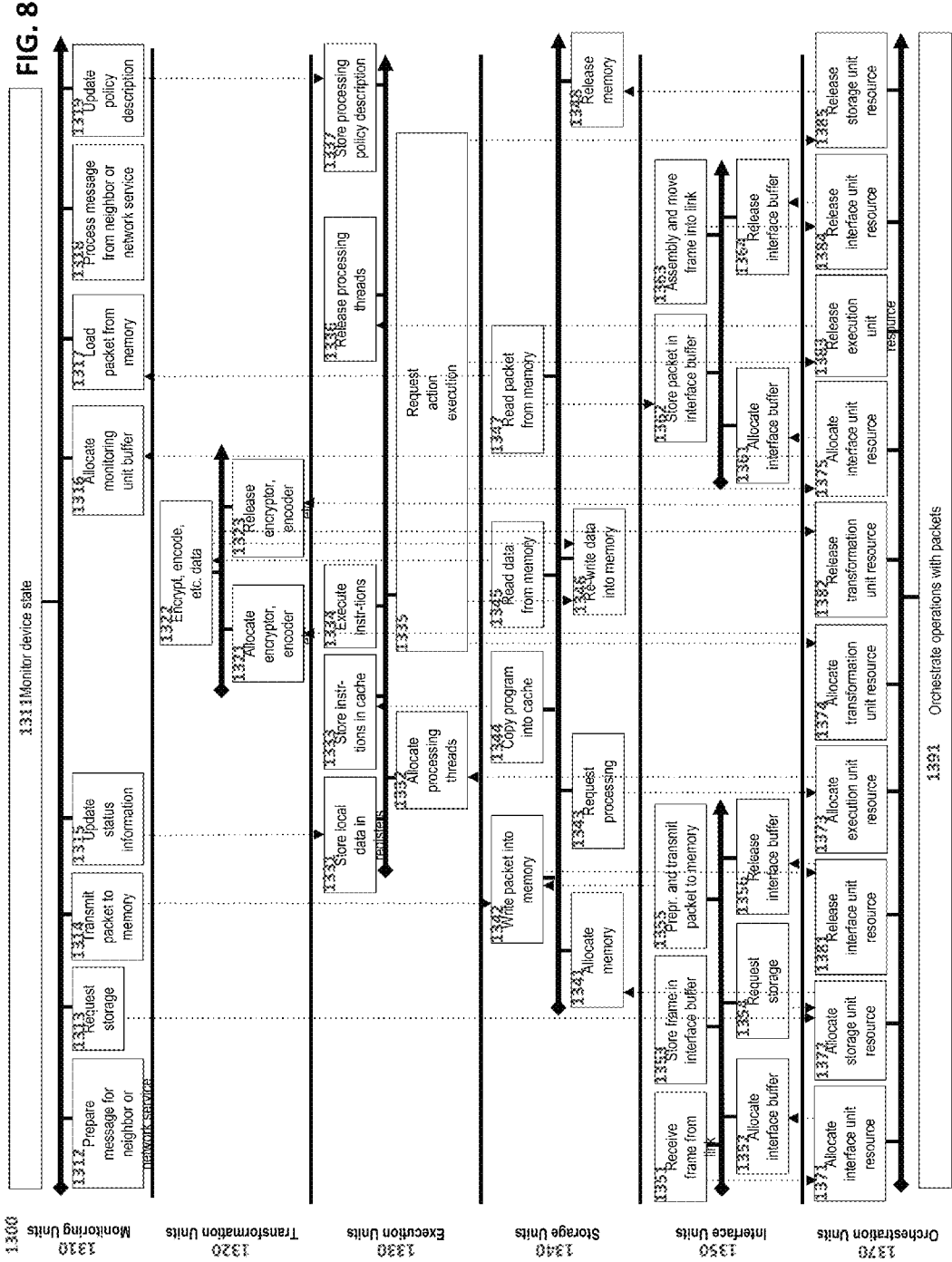
FIG. 8 is a schematic view of disclosed methods of packet processing described in terms of hardware blocks

Referring to FIG. 8, a disclosed system 1300 is described in terms of functional units, such as monitoring units 1310, transformation units 1320, execution units 1330, storage units 1340, interface units 1350 and orchestration units 1370.

Monitoring units 1310 may monitor a device state 1311, prepare message for neighbor or network service 1312, request storage for packet containing prepared message 1313, transmit packet to memory 1314, update device status information 1315, allocate unit buffer for incoming packet containing message 1316, load packet from memory 1317, process received message from neighbor or network service 1318, and update policy description 1319.

Transformation units 1320 may allocate encoder or other resources for packet transformation 1321, encode and otherwise manipulate packet content 1322, release encoder or other resources involved in packet transformation 1323.

Execution units 1330 may store local values of operands in registers 1331, allocate processing threads 1332, store instructions in cache 1333, execute instructions 1334, request action execution 1335, release processing threads 1336, store processing policy description 1337.

Storage units 1340 may allocate memory 1341, write packet into memory 1342, request packet processing 1343, copy program (instruction set) from memory into cache 1344, read (transfer) data segment from memory for transformation 1345, re-write data into memory after instruction execution or data transformation 1346, read packet from memory into interface buffer 1347, and release memory 1348.

Interface units 1350 may receive frame (packet) from link 1351, allocate input interface buffer 1352, store frame in input interface buffer 1353, request storage for packet 1354, preprocess and transmit packet to memory 1355, release input interface buffer 1356, allocate output interface buffer 1361, store packet in output interface buffer 1362, assembly and move frame into link 1363, release output interface buffer 1364.

Orchestration units 1370 may include allocate interface unit resource for incoming packet 1371, allocate storage unit resource for received packet 1372, allocate execution unit resource for embedded-in-packet instruction set execution 1373, allocate transformation unit resource for packet data transformation (if needed) 1374, allocate interface unit resource for outgoing packet 1375, release interface unit resource after receiving packet 1381, release transformation unit resource after packet data transformation 1382, release execution unit resource after instruction set execution 1383, release interface unit resource after packet transmission 1384, release storage unit resource after all manipulations with packet 1385. The orchestration units orchestrate all operations with packets within a network element 1391.

Figure 9:
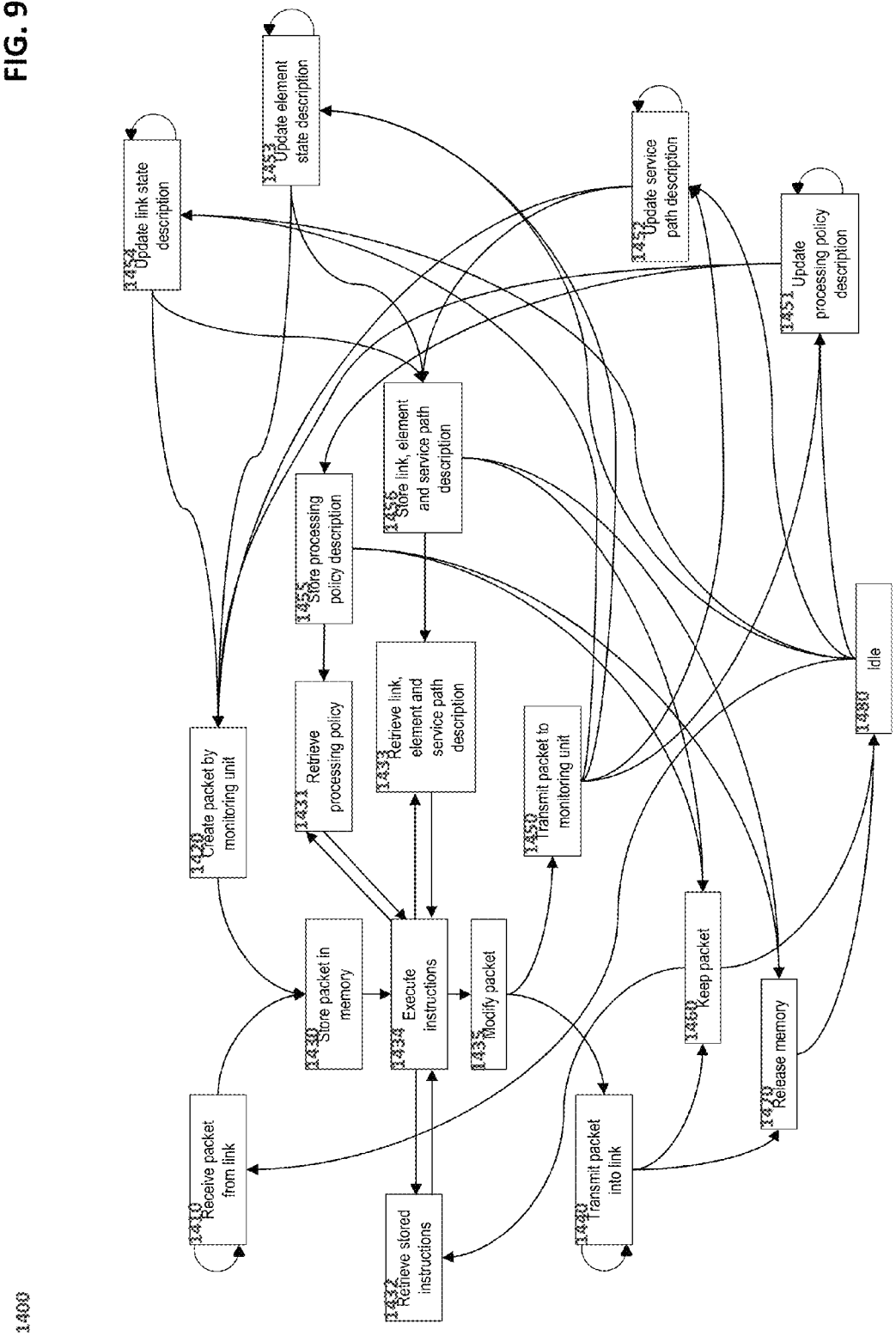
FIG. 9 is a schematic view of states of network elements

Referring to FIG. 9, a disclosed network element state diagram 1400 describes various and alternative routes and actions in packet travel within each network element in routing-table-free network. The arrows between actions and states help to describe the many possible routes.

The various actions and states may include: receive packet from link 1410, create packet by monitoring unit 1420, store packet in memory 1430, retrieve processing policy 1431, retrieve stored instructions 1432, retrieve link, element and service path description 1433, execute instructions 1434, modify packet 1435, transmit packet into link 1440, transmit packet to monitoring unit 1450, update processing policy description 1451, service path description 1452, update element state description 1453, update link state description 1454, store processing policy description 1455, store link, element and service path description 1456, keep packet 1460, release memory 1470, idle 1480.

Items

Disclosed embodiments include the following items

Item 1. A method of packet delivery in communication network, the method comprising: using special packet comprising (1) link-layer header, (2) set of instructions, (3) data and (4) link-layer trailer;
embedding in every packet the set of instructions that completely define: (1) the packet routes over the network from a sender to receiver, (2) the packet possible transformations on the way; and;
executing of instructions set by every network element in order to determine: (1) a next network element(s) the packet is to be forwarded, (2) possible packet's transformation.

Item 2. The method of item 1 further including:
advertising by the every network element itself to the immediately linked neighbors after initial booting procedure or upon its own state changes;
receiving and processing by the every network element the advertise messages from the immediately linked neighbors in order to keep actual information regarding to the state of every link;
providing by the every network retransmission element link state to a specialized central network service on its own initiative (in case of changes) or on request (at the time of network initial configuration, audit or reconfiguration);
receiving and processing by specialized central network service link state description from each network retransmission element in order to build and maintain network topology;
providing network topology by specialized central network service to all other specialized central network services in order to resolve the tasks of path calculations, name registration and network policies support;

calculating paths between network retransmission elements and service components by specialized central network service and providing paths description information to all network retransmission elements;

providing processing policy description to all network retransmission elements by specialized central network service;

registering physical and logical identifiers/names of the network element and binding them to network topology by specialized central network service;

resolving the receiver names and/or identifiers in the formal description of the network element's location on the map on the sender request by specialized central network service;

calculating path between the sender and receiver on the sender request by a specialized central network service;

generating instructions set that includes (1) receiver(s) location description, (2) calculated path(s) to it(them) and (3) algorithm to direct and transform the packets linking generated instruction set to every outgoing segment of data executing the instructions set by the sender itself and defining egress interface to send the related data segment into the network;

attaching link-level header and trailer to the executed instructions set and the data segment and transmitting the assembled packet into the link through the defined egress interface;

receiving the packet on an ingress interface of a neighbor network element, extracting the instructions set and data from the packet, executing the instructions set, defining the required transformations and the egress interface;

modifying (or not) instructions set and/or data, storing (or not) the packet on the network element (fully or partially, for a while) in accordance to the defined transformation requirements;

embedding (transformed or not) instructions set and data into the packet and transmitting the packet into the link through the defined egress interface;

receiving by the receiver the packet on an ingress interface, extracting instructions set and data from the packet, executing instructions set and defining required transformations and an egress interface (an internal logical interface, in this case) for the packet; and transforming (or not) by the receiver the data based on defined transformation requirements.

Item 3. A system of packet delivery in communication network, the system comprising:

a plurality of network endpoints any of which can be as senders well as receivers (NE);

a plurality of network intersections comprising intra-region (NI) and inter-region (NG) retransmission elements;

a plurality of network map service components (NMS);

a plurality of name registrar service components (NRS);

a plurality of pathfinder service components (PFS);

a plurality of network policy service components (NPS); and a plurality of links between all above mentioned network elements.

Item 4. The system of item 3 wherein the network endpoint auto-configures the links with immediate neighbor elements, provides data about itself to network services, prepares data to send, requests and receives location of receiver, requests and receives path to receiver, generates instructions sets, segments data and attaches instructions set to each data segment, executes packet instructions set to direct packet, attaches link-level header and trailer to the instruction set and data segment, transfers packet into the link, receives packet, extracts instructions set and data, executes packet instructions set to define required transformations, transforms packet content (if it's needed), assemblies segmented data from the packet sequence.

Item 5. The system of item 3 wherein the network intersection auto-configures the links with immediate neighbor elements, provides data about itself to network services, receives packet, extracts instructions set and data segment from packet, executes packet instructions set, receives the packet directing and transformation commands as outcome of instructions set execution, in accordance to commands—modifies instructions set and data, stores instructions set and data (fully or partially for a while), deletes instructions set and data, transmits instructions set and data (attaching to them link-level header and trailer) towards specified neighbor network element.

Item 6. The system of item 3 wherein the network map central service builds and updates network topology, comprising all network elements and links between them.

Item 7. The system of item 3 wherein the name registrar central service maintains abstract names, network and link identifiers of network elements and binds this data with network elements locations on the map.

Item 8. The system of item 3 wherein the pathfinder central service calculates paths between any network elements on the map.

Item 9. The system of item 3 wherein the network policy central service distributes the rules of instructions set execution to the all network components.

Item 10. The system of item 3 wherein the system further comprises of a plurality of network regions that comprising a plurality of network endpoints and network intersections that are served by its own central network service components. Every network region functions as fully autonomous system and interacts with other network regions. The entire network is presented as set of interconnected regions.

Item 11. An apparatus of packet delivery in communication network, the apparatus comprising:

a plurality of units for orchestrating of operations with packets (OU);

a plurality of units for receiving and transmitting packets from/to links (IU);

a plurality of units for storing packets (SU);

a plurality of units for executing instructions set from packets (EU);

a plurality of units for transforming packets (TU); and a plurality of units for monitoring and maintenance of the device (MU).

Item 12. The apparatus of item 11 wherein OU builds a sequence of operations, performed on each packet, and manages the allocation to them resources in all other units.

Item 13. The apparatus of item 11 wherein IU:

on receiving a packet on the ingress interface, informs OU about packet coming, collects a bit-sequence from the link, extracts the instructions set and data from the bit-sequence, transmits the instructions set and data to the SU following the OU directives;

on transmitting a packet through the egress interface, receives OU directives, generates link-level header and trailer, transmits a bit-sequence into the egress link comprising the header, instructions set and data (stored in SU), trailer.

Item 14. The apparatus of item 11 wherein SU, following the OU directives:

receives a instructions set and a data from IU, TU or MU and stores them in memory;

transmits an instructions set from memory to the EU; transmits a data from memory to MU; and transmits an instructions set and a data to IU or TU.

Item 15. The apparatus of item 11 wherein EU, following the OU directives and in accordance with execution policy, loads an instructions set from SU, executes the instructions set (providing local values for some operands), creates an action set that should be performed on the packet (the instructions set itself and related data) as an instructions set execution outcome, provides action set to the OU.

Item 16. The apparatus of item 11 wherein TU, following the OU directives, transforms the packet by changing the packet content (either instructions set or data), as an example: encoded or decoded data, recompile packet instructions set etc.

Item 17. The apparatus of item 11 wherein MU provides access to the device configuration, monitors device status, sends and receives packets with messages to/from neighbors and network service components as logical IU, keeps links, paths and policy description data.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A method of packet delivery in a communication network comprising network elements, the method comprising:
   a) using special packets each comprising (1) a link-layer header, (2) a first set of instructions, (3) data and (4) a link-layer trailer;
   b) embedding in every special packet the first set of instructions that completely define: (1) packet routes over the communication network from a sender to a receiver, (2) the special packet's possible transformations on the way; and
   c) executing the first set of instructions set by every network element in order to determine: (1) a next network element(s) the special packet is to be forwarded, (2) the special packet's possible transformation;
   d) advertising, by every network element, an advertise message of itself to the immediately linked neighbors after initial booting procedure or upon its own state changes;
   e) receiving and processing, by every network element, the advertise messages from the immediately linked neighbors in order to keep actual information regarding to the state of every link;
   f) providing, by every network element, a retransmission element link state description to a specialized central network service on its own initiative or on request;
   g) receiving and processing, by the specialized central network service, the retransmission element link state description from each network retransmission element in order to build and maintain a network topology;
   h) providing the network topology, by the specialized central network service, to all other specialized central network services in order to resolve tasks of path calculations, name registration and network policies support;
   i) calculating paths between network retransmission elements and service components by the specialized central network service, and providing paths description information to all network retransmission elements;
   j) providing a processing policy description to all network retransmission elements by the specialized central network service;
   k) registering physical and logical identifiers/names of the network elements and binding them to the network topology by the specialized central network service;
   l) resolving receiver names and/or identifiers in a formal description of a network element's location on a map on a sender request by the specialized central network service;
   m) calculating a path between the sender and the receiver on the sender request by the specialized central network service;
   n) generating, based on (I) the resolved receiver(s) location description and (II) the calculated path(s) to the receiver(s), a second set of instructions that includes an algorithm to (1) direct packets over the communication network from the sender to the receiver, (2) transform packets on the way;
   o) linking the second set of instructions to every outgoing segment of data;
   p) executing the second set of instructions by the sender and defining a first egress interface to send a related data segment into the communication network;
   q) attaching a link-level header and trailer to the executed second set of instructions and the data segment and transmitting the assembled packet into a first link through the defined first egress interface;
   r) receiving the assembled packet on a first ingress interface of a neighbor network element, extracting the second set of instructions and the data segment from the assembled packet, executing the second set of instructions, and defining required transformations and a second egress interface;
   s) modifying the second set of instructions and/or the data segment, storing the assembled packet on the network element in accordance to the defined required transformations;
   t) embedding the second set of instructions and the data segment into the assembled packet and transmitting the assembled packet into a second link through the defined second egress interface;
   u) receiving, by the receiver, the packet on a second ingress interface, extracting the second set of instructions and the data segment from the assembled packet, executing the second set of instructions, and defining required transformations and a third egress interface for the assembled packet; and
   v) transforming, by the receiver, the data segment based on the defined required transformations.

* * * * *